US011700403B2

(12) United States Patent
Jaspers et al.

(10) Patent No.: US 11,700,403 B2
(45) Date of Patent: *Jul. 11, 2023

(54) METHODS, SYSTEMS, AND MEDIA FOR PRESENTING MEDIA CONTENT ITEMS USING MULTIPLE DEVICES

(71) Applicant: Google LLC, Mountain View, CA (US)

(72) Inventors: Tom Jaspers, Zurich (CH); Ramona Bobohalma, Zurich (CH); Andreea Chelaru, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/671,937

(22) Filed: Feb. 15, 2022

(65) Prior Publication Data

US 2022/0174343 A1 Jun. 2, 2022

Related U.S. Application Data

(63) Continuation of application No. 17/007,161, filed on Aug. 31, 2020, now Pat. No. 11,259,061, which is a
(Continued)

(51) Int. Cl.
*H04N 21/2543* (2011.01)
*H04N 21/436* (2011.01)
(Continued)

(52) U.S. Cl.
CPC ....... *H04N 21/2543* (2013.01); *H04N 21/235* (2013.01); *H04N 21/236* (2013.01);
(Continued)

(58) Field of Classification Search
None
See application file for complete search history.

(56) References Cited

U.S. PATENT DOCUMENTS 7,699,703 B2 4/2010 Muir et al.
9,137,494 B2 9/2015 McCarthy et al.
(Continued)

FOREIGN PATENT DOCUMENTS

JP 2013240024 11/2013
KR 20150019496 2/2015
(Continued)

OTHER PUBLICATIONS

Baxter, B., "Alternative Input Methods for Android TV", last updated Aug. 17, 2018, pp. 1-12, available at: https://android-developers.googleblog.com/2018/08/alternative-input-methods-for-android-tv.html.
(Continued)

*Primary Examiner* — William J Kim
(74) *Attorney, Agent, or Firm* — Byrne Poh LLP

(57) ABSTRACT

Mechanisms for presenting media content items using multiple devices are provided. In some embodiments, methods for presenting media content are provided that include: detecting an offer to initiate a purchase of a content item being presented using the media device, wherein the media device has not been authenticated with a content service that provides the content item; in response to detecting the offer to initiate the purchase of the content item when the media device has not been authenticated with the content service that provides the content item, causing the media device to be discoverable by one or more mobile devices that are connected to a same local area network as the media device; encoding offer data corresponding to the detected offer to initiate the purchase of the content item; in response to receiving a status request from a mobile device that is connected to the same local area network as the media device, transmitting the encoded offer data associated with the purchase of the content item to the mobile device,
(Continued)

wherein the encoded offer data causes a payment user interface to be presented on the mobile device; receiving a cast request from the mobile device to cast the content item on the media device; and in response to the cast request, executing a receiver application on the media device that accepts the cast request from the mobile device and causes the content item to be presented using the media device.

21 Claims, 5 Drawing Sheets

Related U.S. Application Data continuation of application No. PCT/US2019/064210, filed on Dec. 3, 2019.

(51) Int. Cl.
| | |
|---|---|
| H04N 21/235 | (2011.01) |
| H04N 21/236 | (2011.01) |
| H04N 21/239 | (2011.01) |
| H04N 21/258 | (2011.01) |
| H04N 21/4185 | (2011.01) |
| H04N 21/472 | (2011.01) |
| H04N 21/81 | (2011.01) |

(52) U.S. Cl.
CPC ... *H04N 21/2393* (2013.01); *H04N 21/25816* (2013.01); *H04N 21/25875* (2013.01); *H04N 21/4185* (2013.01); *H04N 21/43615* (2013.01); *H04N 21/47217* (2013.01); *H04N 21/8166* (2013.01)

(56) References Cited

U.S. PATENT DOCUMENTS

| | | | |
|---|---|---|---|
| 10,298,981 | B2 | 5/2019 | Yang et al. |
| 10,341,706 | B2 | 7/2019 | Evans et al. |
| 10,424,009 | B1 | 9/2019 | Paton |
| 10,735,785 | B1 | 8/2020 | Hamrick et al. |
| 10,839,416 | B1 | 11/2020 | Desmond et al. |
| 2007/0180485 | A1 | 8/2007 | Dua |
| 2007/0217436 | A1 | 9/2007 | Markley et al. |
| 2008/0092154 | A1 | 4/2008 | Hogyoku |
| 2008/0092157 | A1 | 4/2008 | Walter et al. |
| 2009/0125971 | A1 | 5/2009 | Belz et al. |
| 2010/0017816 | A1 | 1/2010 | Martini et al. |
| 2011/0167456 | A1 | 7/2011 | Kokenos et al. |
| 2011/0283333 | A1 | 11/2011 | Ukkadam |
| 2011/0289537 | A1 | 11/2011 | Buehl |
| 2012/0150750 | A1 | 6/2012 | Law et al. |
| 2012/0198572 | A1 | 8/2012 | Beals et al. |
| 2012/0222055 | A1 | 8/2012 | Schaefer et al. |
| 2013/0167167 | A1 | 6/2013 | Steyer et al. |
| 2013/0273882 | A1 | 10/2013 | Walsh et al. |
| 2014/0058897 | A1 | 2/2014 | Yang et al. |
| 2015/0100983 | A1 | 4/2015 | Pan |
| 2015/0113566 | A1 | 4/2015 | Koderisch |
| 2015/0326935 | A1 | 11/2015 | Owen |
| 2016/0205439 | A1 | 7/2016 | Bonovich et al. |
| 2016/0210665 | A1 | 7/2016 | Champy |
| 2017/0142460 | A1 | 5/2017 | Yang et al. |
| 2017/0195695 | A1 | 7/2017 | Patrick et al. |
| 2019/0166392 | A1 | 5/2019 | Eyer |
| 2020/0221155 | A1 | 7/2020 | Hansen et al. |
| 2020/0236152 | A1 | 7/2020 | Bradley et al. |

FOREIGN PATENT DOCUMENTS

| | | |
|---|---|---|
| WO | 2014080508 | 5/2014 |
| WO | 2017085759 | 5/2017 |

OTHER PUBLICATIONS

International Search Report and Written Opinion dated Apr. 20, 2020 in International Patent Application No. PCT/US2019/064210.
Notice of Allowance dated Oct. 13, 2021 in U.S. Appl. No. 17/007,161.
Office Action dated Jun. 21, 2021 in U.S. Appl. No. 17/007,161.
Examination Report dated Oct. 21, 2022 in IN Patent Application No. 202247036125.
Office Action dated Dec. 12, 2022 in JP Patent Application No. 2022-517894.
Office Action dated Feb. 14, 2023 in KR Patent Application No. 10-2022-7007451.

```
                                                              100
┌─────────────────────────────────────────────────────────┐
│ DETECT THAT AN OFFER TO INITIATE A PURCHASE OF A        │
│ CONTENT ITEM FOR PRESENTATION BY A MEDIA DEVICE         │
│ WITHOUT BEING AUTHENTICATED TO A SERVICE                │—— 110
│ PROVIDING THE CONTENT ITEM (E.G., SELECTING A "BUY"     │
│ BUTTON ASSOCIATED WITH THE CONTENT ITEM USING A         │
│ REMOTE CONTROL DEVICE)                                  │
└─────────────────────────────────────────────────────────┘
                              │
                              ▼
┌─────────────────────────────────────────────────────────┐
│ IN RESPONSE TO THE DETECTING THE OFFER AND              │
│ DETERMINING THAT A USER ACCOUNT HAS NOT BEEN            │
│ AUTHENTICATED ON THE MEDIA DEVICE, CAUSING THE          │
│ MEDIA DEVICE TO BE DISCOVERABLE BY ADDITIONAL           │—— 120
│ DEVICES ASSOCIATED WITH A LOCAL AREA NETWORK            │
│ (E.G., MOBILE DEVICES ASSOCIATED WITH THE SAME          │
│ LOCAL AREA NETWORK)                                     │
└─────────────────────────────────────────────────────────┘
                              │
                              ▼
┌─────────────────────────────────────────────────────────┐
│ ENCODE OFFER DATA ASSOCIATED WITH PURCHASING            │—— 130
│ THE CONTENT ITEM (E.G., ADDITIONALFIELD DATA)           │
└─────────────────────────────────────────────────────────┘
                              │
                              ▼
┌─────────────────────────────────────────────────────────┐
│ IN RESPONSE TO RECEIVING A STATUS REQUEST FROM          │
│ ONE OF THE ADDITIONAL DEVICES ASSOCIATED WITH           │—— 140
│ THE LOCAL AREA NETWORK, TRANSMIT THE ENCODED            │
│ OFFER DATA TO THE MOBILE DEVICE                         │
└─────────────────────────────────────────────────────────┘
                              │
                              ▼
┌─────────────────────────────────────────────────────────┐
│ RECEIVE AN INDICATION TO CAST THE CONTENT ITEM          │
│ FROM MOBILE DEVICE, WHERE THE CONTENT ITEM IS           │
│ PRESENTED BY THE MEDIA DEVICE (E.G., THE MOBILE         │—— 150
│ DEVICE COMPLETES THE TRANSACTION TO PURCHASE            │
│ THE CONTENT ITEM AND RECEIVES AUTHORIZATION TO          │
│ RECEIVE THE CONTENT ITEM)                               │
└─────────────────────────────────────────────────────────┘
```

FIG. 1

METHODS, SYSTEMS, AND MEDIA FOR PRESENTING MEDIA CONTENT ITEMS USING MULTIPLE DEVICES

CROSS-REFERENCE TO RELATED APPLICATIONS

This application is a continuation of U.S. patent application Ser. No. 17/007,161, filed Aug. 31, 2020, which is a continuation of International Patent Application No. PCT/US2019/064210, filed Dec. 3, 2019, each of which is hereby incorporated by reference herein in its entirety.

TECHNICAL FIELD

The disclosed subject matter relates to methods, systems, and media for presenting media content items using multiple devices.

BACKGROUND

Many users want to watch media content associated with a video hosting or sharing services on media devices, such as their televisions or other display devices. It is often preferable or necessary to sign in to a user account associated with the service to access and view media content. In particular, such users must be signed in to a user account associated with the service to purchase the media content for playback on the media device. However, it is generally difficult to provide the user account information, such as a username and a password, and/or payment information, such as credit card information, in these types of media devices. For example, using input devices like remote controls to sign in to a user account from the media device and/or complete a payment transaction from the media device can be time consuming and/or cumbersome.

Accordingly, it is desirable to provide methods, systems, and media for presenting media content items using multiple devices.

SUMMARY

Methods, systems, and media for selecting formats for presenting media content items using multiple devices are provided.

In accordance with some embodiments of the disclosed subject matter, a method for presenting media content is provided, the method comprising: detecting an offer to initiate a purchase of a content item being presented using the media device, wherein the media device has not been authenticated with a content service that provides the content item; in response to detecting the offer to initiate the purchase of the content item when the media device has not been authenticated with the content service that provides the content item, causing the media device to be discoverable by one or more mobile devices that are connected to a same local area network as the media device; encoding offer data corresponding to the detected offer to initiate the purchase of the content item; in response to receiving a status request from a mobile device that is connected to the same local area network as the media device, transmitting the encoded offer data associated with the purchase of the content item to the mobile device, wherein the encoded offer data causes a payment user interface to be presented on the mobile device; receiving a cast request from the mobile device to cast the content item on the media device; and, in response to the cast request, executing a receiver application on the media device that accepts the cast request from the mobile device and causes the content item to be presented using the media device. Thus, the method may overcome the technical difficulties (e.g. the required time, and the risk of errors) of entering data into a content service for providing content to a media device by relying entirely on a data entry device associated with the media device (e.g. a remote control device). It does this by taking advantage of the typically more sophisticated data entry capability of a mobile device. This is achieved in a secure manner, despite the additional involvement of the mobile device.

In some embodiments, the media device is executing a media playback application and the mobile device is executing a corresponding media playback application, the media playback application transmits the encoded offer data to the corresponding media playback application executing on the mobile device, and, in response to transmitting the encoded offer data to the mobile device, the media device inhibits the transmission of the encoded offer data to remaining mobile devices that are connected to the same local area network.

In some embodiments, the encoded offer data causes the mobile device to retrieve corresponding human-readable information from a server, where the human-readable information is presented in the payment user interface on the mobile device.

In some embodiments, the method further comprises receiving authentication information from the mobile device, wherein the authentication information corresponds to a user account that was used to complete the purchase via the payment user interface on the mobile device. In some embodiments, the authentication information causes the media device to retrieve a corresponding authentication token from an authentication server, wherein the corresponding authentication token authenticates the user account on the media device.

In some embodiments, the cast request indicates that the mobile device is authorized to play back the content item.

In accordance with some embodiments of the disclosed subject matter, a system for presenting media content is provided, the system comprising a memory and a hardware processor that, when executing computer-executable instructions stored in the memory, is configured to: detect an offer to initiate a purchase of a content item being presented using the media device, wherein the media device has not been authenticated with a content service that provides the content item; in response to detecting the offer to initiate the purchase of the content item when the media device has not been authenticated with the content service that provides the content item, cause the media device to be discoverable by one or more mobile devices that are connected to a same local area network as the media device; encode offer data corresponding to the detected offer to initiate the purchase of the content item; in response to receiving a status request from a mobile device that is connected to the same local area network as the media device, transmit the encoded offer data associated with the purchase of the content item to the mobile device, wherein the encoded offer data causes a payment user interface to be presented on the mobile device; receive a cast request from the mobile device to cast the content item on the media device; and, in response to the cast request, execute a receiver application on the media device that accepts the cast request from the mobile device and causes the content item to be presented using the media device.

In accordance with some embodiments of the disclosed subject matter, a computer program product (such as a non-transitory computer-readable medium or an item of software for download over a communication network) containing computer executable instructions that, when executed by a processor, cause the processor to perform a method for presenting media content is provided, the method comprising: detecting an offer to initiate a purchase of a content item being presented using the media device, wherein the media device has not been authenticated with a content service that provides the content item; in response to detecting the offer to initiate the purchase of the content item when the media device has not been authenticated with the content service that provides the content item, causing the media device to be discoverable by one or more mobile devices that are connected to a same local area network as the media device; encoding offer data corresponding to the detected offer to initiate the purchase of the content item; in response to receiving a status request from a mobile device that is connected to the same local area network as the media device, transmitting the encoded offer data associated with the purchase of the content item to the mobile device, wherein the encoded offer data causes a payment user interface to be presented on the mobile device; receiving a cast request from the mobile device to cast the content item on the media device; and, in response to the cast request, executing a receiver application on the media device that accepts the cast request from the mobile device and causes the content item to be presented using the media device.

In accordance with some embodiments of the disclosed subject matter, a system for presenting media content is provided, the system comprising: means for detecting an offer to initiate a purchase of a content item being presented using the media device, wherein the media device has not been authenticated with a content service that provides the content item; in response to detecting the offer to initiate the purchase of the content item when the media device has not been authenticated with the content service that provides the content item, means for causing the media device to be discoverable by one or more mobile devices that are connected to a same local area network as the media device; means for encoding offer data corresponding to the detected offer to initiate the purchase of the content item; in response to receiving a status request from a mobile device that is connected to the same local area network as the media device, means for transmitting the encoded offer data associated with the purchase of the content item to the mobile device, wherein the encoded offer data causes a payment user interface to be presented on the mobile device; means for receiving a cast request from the mobile device to cast the content item on the media device; and in response to the cast request, means for executing a receiver application on the media device that accepts the cast request from the mobile device and causes the content item to be presented using the media device.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIG. 1 shows an illustrative example of a process for mobile device-assisted purchasing of content items for playback using a connected media device, where encoded offer data is broadcast to one or more mobile devices to purchase a content item, in accordance with some embodiments of the disclosed subject matter.

DETAILED DESCRIPTION

Figure 2:
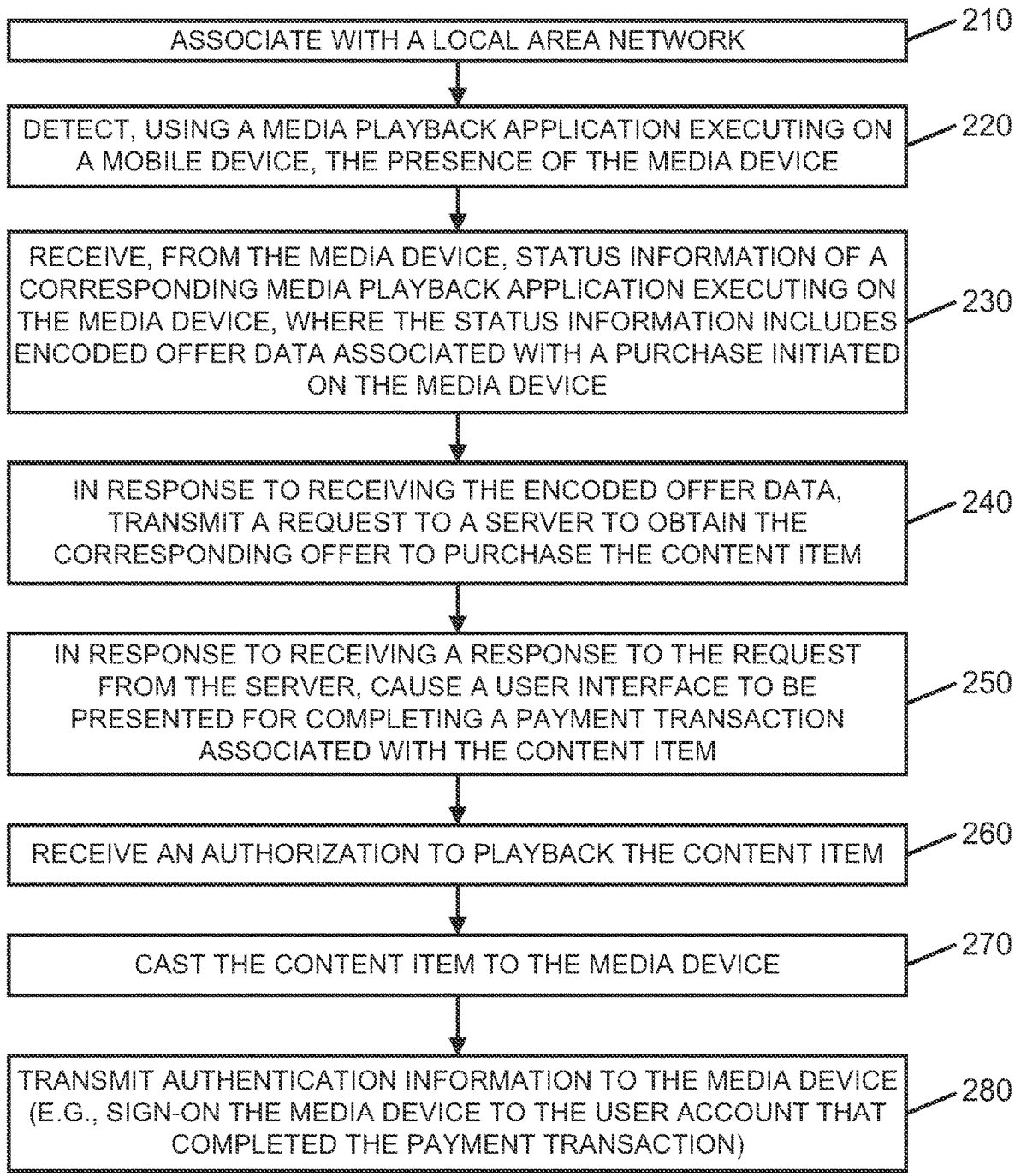
FIG. 2 shows an illustrative example of a process for using a mobile device to detect the presence of a media device, presenting a user interface for completing a payment transaction associated with the purchase of a content item, and casting the content item for presentation using the media device in accordance with some embodiments of the disclosed subject matter.

In accordance with various embodiments, mechanisms (which can include methods, systems, and media) for presenting media content items using multiple devices are provided.

In some embodiments, the mechanisms described herein can detect that an offer to initiate a purchase of a content item is being presented using the media device. For example, while navigating through multiple content items being presented on a media device (e.g., using a remote control device), the mechanisms can detect that a selected content item is associated with an offer to provide a payment in exchange for playing back the content item. In a more particular example, while navigating through multiple content items being presented on the media device, the mechanisms can detect that a selected content item is associated with a "buy" button or a "rent" button. In some embodiments, upon detecting the presented offer, the mechanisms can also determine that the media device has not been authenticated to a service that is providing the content item. For example, the media device has not signed into a service and, as such, user payment information is not stored for use in purchasing or other paying for the selected content item.

It should be noted that, in some embodiments, the media device is connected to a display device and the display device presents the user interface for navigating through multiple content items and a media player for playing back one of the content items.

In some embodiments, in response to detecting the offer to initiate the purchase of the content item when the media device has not been authenticated with the content service that provides the content item, the mechanisms can cause the media device to be made discoverable by one or more mobile devices that are connected to a same local area network as the media device. For example, the media device can implement the server side of the Discovery And Launch (DIAL) protocol to broadcast its presence to devices connected to the same local area network. In continuing this example, one or more mobile devices connected to the same local area network can implement the client side of the DIAL protocol, where the mobile device can discover the DIAL service on the media device on the local area network and can launch applications on a DIAL server. In a more particular example, the mobile device can, using a media playback application executing on the mobile device, use the DIAL server to prompt the media device to launch a corresponding media playback application. This can include passing an IP/port corresponding to the media playback application, a URL to the media playback application, and/or any other suitable information. It should be noted that the DIAL protocol allows for the transfer of arbitrary data between the media device and the mobile device. Accordingly, in some embodiments, the media playback application executing on the media device can return additional information to the DIAL server via an additionalData field.

In some embodiments, the media device can encode offer data associated with the purchase of the content item for placement in the additionalData field. This can include, for example, a content identifier, a description of the content item, a price associated with playing back the content item, the type of purchase, a duration for playing back the content item, an application that is used to playback the content item, etc.

It should be noted that, in some embodiments, the encoded offer data can cause the mobile device to retrieve human-readable information about the corresponding offer from a server (e.g., a media server, a payment server, etc.). In return, one or more payment user interfaces can be presented on the mobile device that provide the human-readable information about the corresponding offer and proceed through a payment transaction for purchasing the content item.

In some embodiments, upon completing the payment transaction, the mobile device can transmit a cast request to cast the content item on the media device. For example, in response to completing the payment transaction and receiving an indication that the mobile device is authorized to playback the content item, the mobile device can be configured to automatically cast the content item for playing back on the media device. In another example, in response to receiving the cast request, the media device can execute a media playback application or any other suitable receiver application that accepts the cast request from the mobile device and causes the content item to be presented using the media device. In a more particular example, the cast request can include a URL or any other suitable content identifier that allows the media device to retrieve the content item for playback.

Additionally to the cast request, in some embodiments, authentication information that corresponds to the user account that was used to complete the purchase of the content item via the payment user interface on the mobile device can be retrieved. For example, the authentication information can cause the media device to retrieve a corresponding authentication token from an authentication server, where the corresponding authentication token authenticates the user account on the media device.

These mechanisms can, for example, allow a user to complete a transaction for the content item without being signed in or otherwise authenticated on the media device and without requiring the user to input authentication information or payment information using an input device associated with the media device (e.g., a remote control device, an on-screen keyboard, etc.) while allowing the user to watch the purchased content item on the media device. These mechanisms can also allow other users (e.g., users having nearby mobile devices) to purchase the content item for playback on the media device (e.g., using a user account that is not associated with the media device). These mechanisms can further allow payment information and other user information to be entered and/or transmitted using a private device as opposed to the media device where there may be additional viewers.

These and other features for presenting media content items using multiple devices are described further in connection with FIGS. 1-5.

Turning to FIG. 1, an illustrative example of a process 100 for mobile device-assisted purchasing of content items for playback using a connected media device in accordance with some embodiments of the disclosed subject matter is shown. As illustrated, blocks of process 100 can be executed by a media device and/or any other suitable computing device(s). For example, the media device can be a user device with no input devices and/or input device that make entry of, among other things, payment information and user credential information difficult, such as a television device, a household appliance, and/or any other suitable display device.

It should be noted that, although the embodiments described herein generally relate to a content item being presented by a media device, this is merely illustrative. In some embodiments, the media device can be a media rendering device that is connected to a display device, where the display device receives instructions from the media rendering device to present, among other things, user interfaces associated with a media playback application for navigating through multiple content items and a media player for playing back one of the content items.

Process 100 can begin at 110 by detecting that an offer to initiate a purchase of a content item is being presented using the media device (e.g., on a display associated with the media device). For example, while navigating through multiple content items being presented on a media device (e.g., using a remote control device or any other suitable input device), process 100 can detect that a selected content item is associated with an offer to provide a payment in exchange for playing back the content item. In a more particular example, while navigating through multiple content items being presented on the media device, process 100 can detect that a selected content item is associated with a "buy" button or a "rent" button. In another more particular example, while navigating through multiple content items, each content item being presented using the media device can be associated with purchase information (e.g., $2.99 for viewing the content item within 48 hours of purchase). In continuing this example, process 100 can detect that the media device has navigated to a page in which the user of the media device is provided with an opportunity to initiate the purchase of a content item (e.g., by selecting a "buy" button on an on-screen interface, by selecting a "buy" button on a remote control device, etc.).

In some embodiments, process 100 can receive an indication of an initiation of a purchase of a content for presentation by the media device. For example, process 100 can receive an indication that a user has selected a content item for playback that has associated purchase information. In another example, process 100 can receive a purchase indicator in response to accessing a page using a media playback application executing on the media device in which the user can initiate the purchase of a content item.

In some embodiments, process 100 can also determine that the media device has not been authenticated to a service that is providing the content item. For example, process 100 can determine that the media device has not been signed into a suitable service in which the user can input payment information and/or user account information. In a more particular example, the media playback application executing on the media device can determine that a user account associated with a content provider has not been authenticated on the media device. As such, in order to proceed with the purchase of the content item, and/or that a user account associated with a payment service has not been authenticated on the media device.

At 120, in response to detecting the offer to initiate the purchase of the content item being presented by the media device and in response to determining that the media device has not been authenticated with the content service that provides the content item, process 100 can cause the media device to be made discoverable by one or more mobile devices that are connected to a same local area network as the media device. For example, the media device can implement the server side of the Discovery And Launch (DIAL) protocol to broadcast its presence to devices connected to the same local area network. In continuing this example, one or more mobile devices connected to the same local area network can implement the client side of the DIAL protocol, where the mobile device can discover the DIAL service on the media device on the local area network and can launch applications on a DIAL server.

It should be noted that a media playback application executing on the media device can create a communication channel with a corresponding media playback application executing on the mobile device. For example, using this communication channel, the media playback application executing on the mobile device can discover the DIAL service implemented on the media device. The media playback application executing on the mobile device can then use the DIAL protocol to query the media device to launch a corresponding media playback application on the media device or to query whether the corresponding media playback application has already been launched on the media device.

In continuing this example, it should be noted that the DIAL protocol can allow for the transfer of arbitrary data between the media device and the mobile device. The DIAL server can transmit, for example, a URL or other suitable information to the media playback application, which the media playback application executing on the media device can use to relay information to the DIAL server.

In some embodiments, at 130, process 100 can encode offer data associated with purchasing the content item. Offer data can include, for example, a content identifier, a description of the content item, a price associated with playing back the content item, the type of purchase, a duration for playing back the content item, an application that is used to playback the content item, a location identifier pointing to where the user has an opportunity to purchase the content item, etc. It should be noted that such encoded offer data can be transmitted to the mobile device as additional information in an additionalData field.

In some embodiments, at 140, process 100 can transmit the encoded offer data to a mobile device. For example, in response to a mobile device that is executing a DIAL client discovering a DIAL server on a media device, the DIAL client executing on the mobile device can transmit a request to determine whether a media playback application is available on the media device, is executing on the media device, and/or other information regarding the status of the media playback application on the media device. In response, the DIAL server response can indicate that the media playback application is already running and can include additional data, which contains the encoded offer data described above. It should be noted that, in some embodiments, the additional data can also enable the media playback application executing on the mobile device to communicate with the running instance of the media playback application executing on the media device.

In a more particular example, a media playback application launched or running on the media device can transmit data, including the additionalData field, to a DIAL server. Such data can also include, for example, device information, application state information, network information, etc. In turn, the DIAL server can communicate the data to DIAL clients that connect to the DIAL server. For example, in response to detecting the offer to initiate the purchase of the content item being presented by the media device and in response to determining that the media device has not been authenticated with the content service that provides the content item, process 100 can cause the media playback application executing on the media device to include the encoded offer data in the additionalData field and can post the encoded offer data to the DIAL server or otherwise broadcast the encoded offer data to a DIAL client executing on a mobile device.

In some embodiments, the media device can determine whether to transmit the encoded offer data to the mobile device. For example, the media device can use any suitable criterion to determine whether to transmit the encoded offer data to the mobile device. In a more particular example, the media device can determine that there are multiple mobile devices in proximity of the media device and that are connected to the same local area network. In continuing this example, the media device can determine whether a preferred mobile device is one of the multiple mobile devices—e.g., a preferred mobile device that has been used greater than a threshold number of times for purchasing content items can be selected to receive the encoded offer data, a mobile device that is associated with a particular type of user (e.g., a minor, a user that is not associated with a payment account, etc.) can be excluded from being selected to receive the encoded offer data, a mobile device that is currently authenticated with a payment service can be selected to receive the encoded offer data, etc.

In some embodiments, the media device can determine a probability as to whether a mobile device that receives the encoded offer data is likely to complete the payment process in purchasing the content item. For example, a mobile device that is associated with a child user can be determined to have a low probability of completing the payment process while a mobile device that is associated with a user that has purchased multiple content items using the mobile device can be designated as having a high probability of completing the payment process.

In continuing this example, in response to a mobile device receiving the encoded offer data, process 100 can cause the media device to inhibit the transmission of the encoded offer data to any remaining mobile devices that are connected to the same local area network. As such, additional mobile devices that are connected to the same local area network, that have discovered the DIAL service executing on the media device, and that have requested status information relating to a media playback application executing on the media device may not receive the encoded offer data in the additionalData field. This can, for example, prevent the purchase of the content item for playback on the media device from being initiated on multiple devices (e.g., mobile device of friend A and mobile device of friend B).

It should be noted that, in some embodiments, in response to determining that the mobile device has not completed the purchase of the content item (e.g., the purchase has not been completed within a threshold amount of time, the mobile device has abandoned the purchase of the content item, etc.), process 100 can cause the media device to continue providing the encoded offer data in the form of additional data.

It should also be noted that, in some embodiments, concurrently with encoding the offer data and transmitting the encoded offer data to a mobile device, process 100 can present a payment interface on the media device for inputting payment information to purchase the content item. For example, in response to selecting the "buy" option in 110, the media device can present a user interface for completing the payment transaction on the media device.

As described below in FIG. 2, the mobile device can receive the encoded offer data and can proceed with the purchase of the content item.

At 150, in response to the mobile device completing the purchase of the content item (e.g., via a payment service) and in response to the mobile device receiving authorization to playback the content item, process 100 can retrieve an indication to cast the content item from the mobile device for presentation by the media device.

In a more particular example, casting technology refers to content streaming and playback that includes a first device that identifies the content item to be played and a second device that provides the playback of the identified content item. For example, the first device is the mobile device that completed the purchase of the content item and received authorization to playback the purchased content item and the second device is the media device that plays back the purchased content item. In casting technology, video encoding of the content item is not performed by the mobile device. Rather, the media playback application executing on the mobile device can transmit a universal resource identifier (URI) (e.g., a universal resource locator (URL)) for the content item to the media device, and the media device can use the URI to obtain the content item from a content provider server via an Internet connection over a network. The media device can receive the content item and can stream the content item from the URI directly to one or more output devices (e.g., a television, a home theater audio system, etc.).

In some embodiments, alternatively to casting the content item from the mobile device to the media device, the mobile device can implement mirroring technology in which the mobile device can receive the content item as a media stream from the content provider server over a communications network (e.g., in response to the mobile device completing the purchase of the content item (e.g., via a payment service) and in response to the mobile device receiving authorization to playback the content item) and can repackage the media stream as a re-formatted media stream for the media device. The mobile device can stream the re-formatted stream over a wireless local area network to the media device. The media device can then output the content item to one or more output devices (e.g., a television, a home theater audio system, etc.).

In some embodiments, as described below in connection with FIG. 2, authentication information corresponding to the user account that was used on the mobile device to purchase the content item can be transmitted to the media device. The media device can use the authentication information to retrieve a corresponding authentication token from an authentication server, where the corresponding authentication token authenticates the user account on the media device.

Turning to FIG. 2, an illustrative example 200 of a process for mobile device-assisted purchasing of content items in which the mobile device receives the encoded offer data and proceeds with the purchase of the content item in accordance with some embodiments of the disclosed subject matter is shown. As illustrated, blocks of process 200 can be executed by a mobile device and/or any other suitable computing device(s). For example, the mobile device can be a user device that supports casting technology or mirroring technology such that, upon completing the payment process in which the content item has been purchased and the mobile device is authorized to receive and playback the content item, the mobile device can cause the content item to be presented by the media device for output on any suitable output device (e.g., a television, a home theater audio system, etc.).

Process 200 begins at 210 with the mobile device associating or connecting with a local network (e.g., a local area network, a wireless local area network, a wired/wireless local area network, or any other suitable network). For example, the mobile device can connect with a wireless local area network having multiple networked media devices. At 220, process 200 can detect, using a media playback application executing on the mobile device, the presence of a media device. For example, using the Discovery And Launch (DIAL) protocol, the mobile device can implement the client side of the DIAL protocol and can discover the DIAL service on the media device. The mobile device can, for example, create a communication channel to exchange messages between a media playback application executing on the mobile device and a corresponding media playback application executing on the media device.

At 230, in response to discovering the DIAL service on the media device, process 200 can receive, from the media device, status information relating to a corresponding media playback application executing on the media device. For example, the DIAL client executing on the mobile device can transmit a request to determine whether a media playback application is available on the media device, is executing on the media device, and/or other information regarding the status of the media playback application on the media device. In response, the DIAL server response can indicate that the media playback application is already running and can include additional data, which contains the encoded offer data relating to the purchase of the content item described above.

As described above, the encoded offer data in the additionalData field can include, for example, a content identifier, a description of the content item, a price associated with playing back the content item, the type of purchase, a duration for playing back the content item, an application that is used to playback the content item, a location identifier pointing to where the user has an opportunity to purchase the content item, etc.

Figure 3:
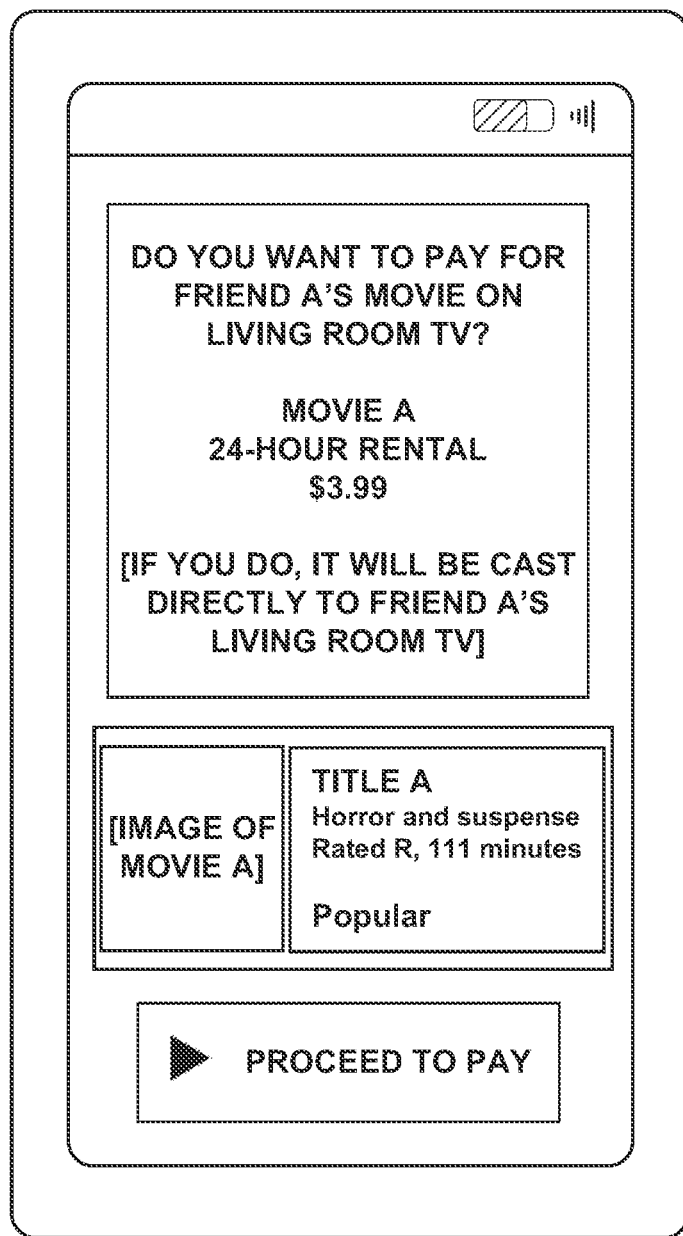
FIG. 3 shows an illustrative user interface for proceed through a payment transaction for purchasing the content item on the mobile device that is connected to the media device and for presentation on the media device in accordance with some embodiments of the disclosed subject matter.

At 240, in response to receiving the encoded offer data, process 200 can transmit a request to a server (e.g., a media server, a payment server, etc.) to obtain human-readable offer information corresponding to the encoded offer data. At 250, process 200 can use the human-readable offer information from the server to generate a user interface for presenting the offer and one or more user interfaces for proceeding through a payment transaction for purchasing the content item. In a more particular example, the human-readable offer information can be combined with information relating to the selected content item to generate a user interface for initiating the payment process on the mobile device. An illustrative example of a user interface that presents the offer and provides the user of the mobile device with an opportunity to proceed through the payment process on the mobile device is shown in FIG. 3.

At 260, in response to completing the payment process for the content item on the mobile device, process 200 can receive an authorization to stream or otherwise playback the content item on the mobile device. For example, the mobile device can receive a confirmation interface indicating that the payment process for the content item has been completed. In continuing this example, a play interface element or any other suitable playback element can activate to allow the user to playback the content item on the mobile device.

At 270, process 270 can cause the purchased content item to be casted to the media device. For example, in some embodiments, the mobile device, upon receiving authorization to play back the content item, can automatically transmit a cast request to the media device that initially received the offer to purchase the content item. In another example, in some embodiments, the mobile device, upon receiving authorization to play back the content item, can present an instruction directing the user of the mobile device to select a cast option to cast the purchased content item to the media device.

As described above, in response to casting the content item from the mobile device to the media device, the media playback application executing on the mobile device can transmit a universal resource identifier (URI) (e.g., a universal resource locator (URL)) for the content item to the media device, and the media device can use the URI to obtain the content item from a content provider server via an Internet connection over a network. The media device can receive the content item and can stream the content item from the URI directly to one or more output devices (e.g., a television, a home theater audio system, etc.).

As also described above, alternatively to casting the content item from the mobile device to the media device, the mobile device can implement mirroring technology in which the mobile device can receive the content item as a media stream from the content provider server over a communications network (e.g., in response to the mobile device completing the purchase of the content item (e.g., via a payment service) and in response to the mobile device receiving authorization to playback the content item) and can repackage the media stream as a re-formatted media stream for the media device. The mobile device can stream the re-formatted stream over a wireless local area network to the media device. The media device can then output the content item to one or more output devices (e.g., a television, a home theater audio system, etc.).

Additionally to causing the content item to be presented on the media device without requiring the user to authenticate a user account (e.g., associated with a content provider service, associated with a payment service, etc.), process 200 can authenticate the media device using the mobile device. For example, concurrently with instructing that a purchase content item is cast from the mobile device for playback on an output device associated with the media device, the mobile device can also transmit a message indicating that a user account that has been authenticated on the mobile device is to also be used for authentication on the media device.

In some embodiments, the mobile device can transmit a message to the media device indicating that a user account is to be logged into from the mobile device. For example, the user account can be the user account associated with a content provider service. In another example, the user account can be the user account that was used to proceed through the payment process in purchasing the content item.

Note that, in some embodiments, the mobile device can initiate authentication of a user account on the media device using user credentials on the mobile device in response to determining that media device is a particular type of user device (e.g., a television, a game console, a home theater audio system, a set-top box, and/or any other suitable type of device). As a more particular example, in some embodiments, the mobile device can determine a device type associated with the media device, and can identify one or more user accounts that have been logged in to with the mobile device that are suitable user accounts to be logged in to from the media device based on the determined device type of the media device. As a specific example, in an instance where the mobile device determines that the media device is a display device, the mobile device can determine that a user account associated with a video sharing service is a candidate user account to be logged in to on the media device using user credentials associated with the mobile device.

In some embodiments, a device type and/or a device category (e.g., television, game console, set-top box, video camera, printer, and/or any other suitable device type) can be determined using any suitable technique(s). For example, in some embodiments, the mobile device can detect the presence of one or more devices, such as a television device, for authenticating with a user account logged in on the mobile device. For example, device discovery of a nearby device can be initiated on the local area network to which the mobile device is connected. It should be noted that device discovery can be initiated by the mobile device at any suitable time and for any suitable reason or reasons. For example, an application executing on the mobile device can initiate device discovery to determine whether the mobile device is on the same network as the media device (e.g., a television device). In a more particular embodiment, the mobile device can execute a full discovery protocol on the network for determining the details of any devices found on the current network. The full discovery protocol can include transmitting a multicast message to all devices on the network requesting device details from the devices on the network. Additionally, the multicast message can be addressed to certain types of devices. In some embodiments, the mobile device can wait a predetermined amount of time for responses to the multicast message. Additionally, in some embodiments, the full discovery protocol can include requesting additional device details from devices that responded by sending a message to an address and/or location included in a reply by the device to the multicast message. Such additional details can include a name of the device, a manufacturer of the device, a model name of the device, a model number of the device, a model description of the device, a serial number of the device, and/or any other suitable device information associated with the device. In some embodiments, a device type or device category (e.g., television, game console, set-top box, etc.) and/or description of the device's capabilities can be included in the response to the message.

In some embodiments, the mobile device can present a first user interface that requests approval to initiate authentication of the media device. In response to a user of the mobile device providing an approval to initiate authentication of a user account on the media device (e.g., "Would you like to also log in to this account on the connected television?" or a prompt to select a user account for authenticating on the media device), the mobile device can transmit an authorization request to the media device.

In some embodiments, the media device can transmit a request to an authorization server in response to receiving the authorization request from the mobile device. In some embodiments, the request can include any suitable information, such as information related to a connection of the mobile device to a device association server (e.g., an identifier associated with the mobile device, and/or any other suitable information), information related to a configuration of the mobile device (e.g., a manufacturer and/or model associated with the mobile device, an operating system associated with the mobile device, and/or any other suitable configuration information), information related to a user of the mobile device (e.g., one or more usernames associated with the mobile device, and/or any other suitable information), and/or any other suitable identifying information. In a more particular example, in some embodiments, the request can indicate an identifier associated with the particular user account that is to be logged in to. As a more particular example, the request can indicate an identity of a service associated with the user account (e.g., a name of a social networking site, a name of a video sharing site, and/or any other suitable identity). As yet another more particular example, the request can indicate any suitable information associated with the media device, such as an Internet Protocol (IP) address associated with the media device, a location of the media device, and/or any other suitable information.

In some embodiments, the authorization server can transmit a message including authentication data to the media device that corresponds to an existing session associated with the user account and associated with the mobile device. In some embodiments, the authentication data can include any suitable information, such as a random sequence of characters (e.g., letters, numbers, any/or any other suitable characters or combination of characters) of any suitable length (e.g., four characters, eight characters, sixteen characters, and/or any other suitable length). For example, in some embodiments, the authentication data can include an encrypted token associated with a current session of the user account established by the mobile device.

In some embodiments, the authorization server can transmit the authentication data in connection with a Uniform Resource Locator (URL) that identifies a page that can be used to sign in to the user account. For example, in some embodiments, the authentication data can be embedded within a query string of the URL. As another example, in some embodiments, the URL can be included in the message transmitted to the media device.

Additionally or alternatively, in some embodiments, the authentication data can indicate any suitable identifying information corresponding to the mobile device and/or the user account. For example, in some embodiments, the authentication data can indicate information about the mobile device (e.g., an identifier of a user associated with the mobile device, an identifier of a manufacturer of the mobile device, an identifier of a product number associated with the mobile device, and/or any other suitable information). As another example, in some embodiments, the authentication data can indicate information associated with the user account (e.g., a date and/or time the user account was last accessed from the mobile device, a Media Access Control (MAC) address associated with a connection last used to access the user account from the mobile device, and/or any other suitable information). In some embodiments, the authentication data can be encrypted using any suitable protocol(s).

In some embodiments, the media device can transmit the authentication data included in the received message to the mobile device. In some embodiments, the media device can perform any suitable processing on the received message to extract the authentication data prior to transmitting the authentication data to the mobile device. For example, in some embodiments, the media device can extract a particular portion of the received message that contains the authentication data. As a more particular example, in instances where the received message includes a URL and the authentication data, the media device can extract the authentication data from the URL.

In response to receiving the authentication data, the mobile device can present a user interface requesting authorization to authenticate the media device. In some embodiments, the mobile device can identify one or more user accounts that can be used by the media device. In some such embodiments, the user interface can further request that a user select a particular user account to be used by the media device.

In some embodiments, the mobile device can transmit information associated with the user account to the media device in response to determining that the media device is to be authenticated. In some embodiments, the transmitted information can indicate that the media device is permitted to access the user account using login information associated with the mobile device. In such embodiments, the transmitted information can include an indicator (e.g., a Boolean, an integer, a flag, and/or any other suitable type of indicator) whose value indicates that permission has been granted to access the user account. In some embodiments, the transmitted information can include any other suitable information, such as an indication of which of multiple user accounts is to be used by the media device.

In some embodiments, the media device can request an authentication token from the authorization server based on the received information. In some embodiments, the media device can log in to the user account, for example, using the URL received from the authentication server. In some embodiments, the media device can then request the authentication token in response to determining that the user account has been successfully logged in to. Alternatively, in some embodiments, the media device can transmit the received information to the authorization server (e.g., transmit an indication that the mobile device has granted permission for the media device to log in to the user account using credentials associated with the mobile device), and can request that the authorization server establish a session associated with the media device and the user account and transmit the authorization token in response to establishing the session.

In some embodiments, the authorization server can transmit the authentication token to the media device. In some embodiments, the authentication token can be used for any suitable purposes. For example, in some embodiments, the authentication token can be used to indicate that the user account has been signed in to by the media device, thereby allowing the user account to remain signed in to on the media device in instances where a particular application is closed.

Figure 4:
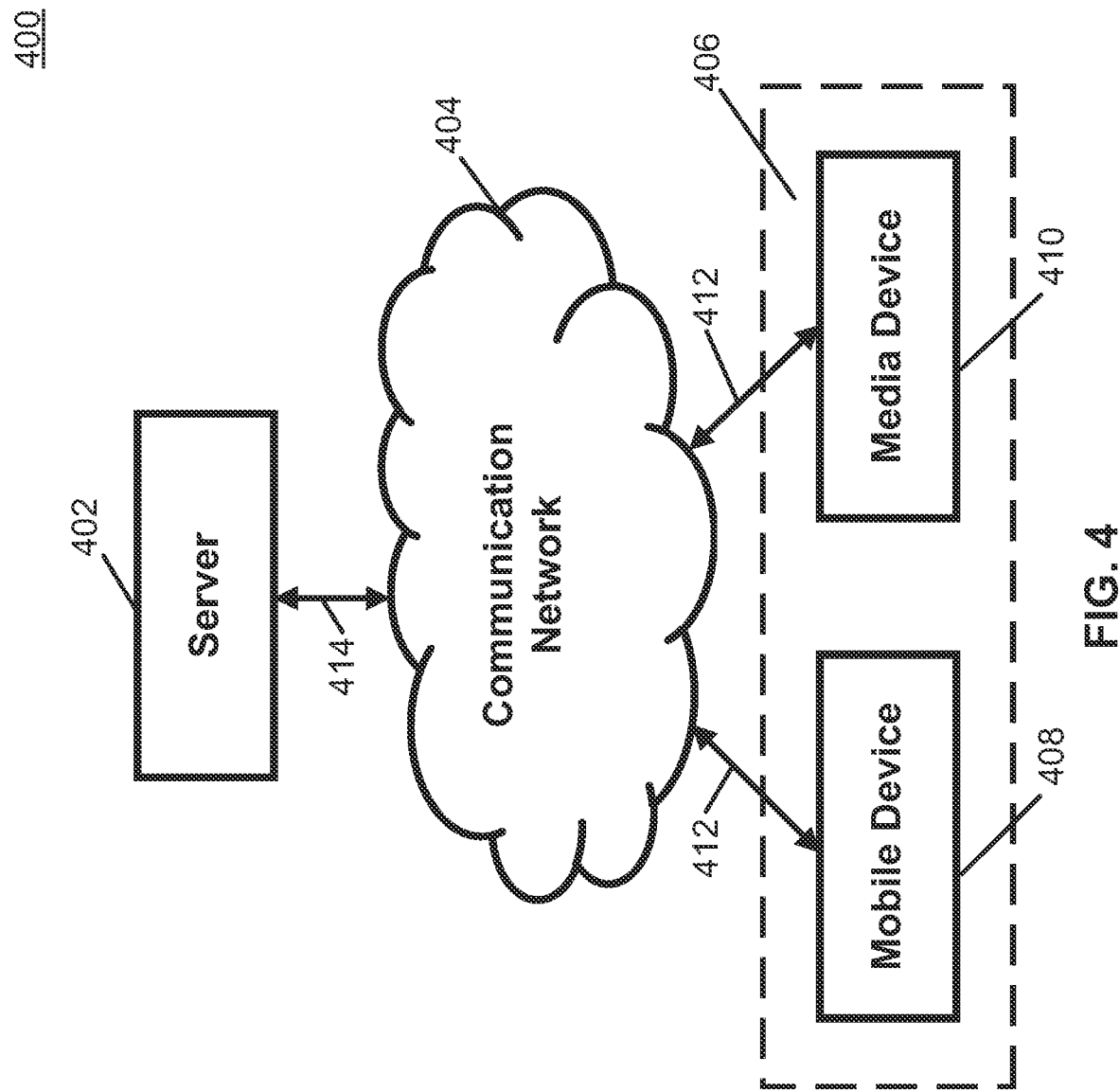
FIG. 4 shows a schematic diagram of an illustrative system suitable for implementation of mechanisms described herein for presenting media content items using multiple devices in accordance with some embodiments of the disclosed subject matter.
Figure 5:
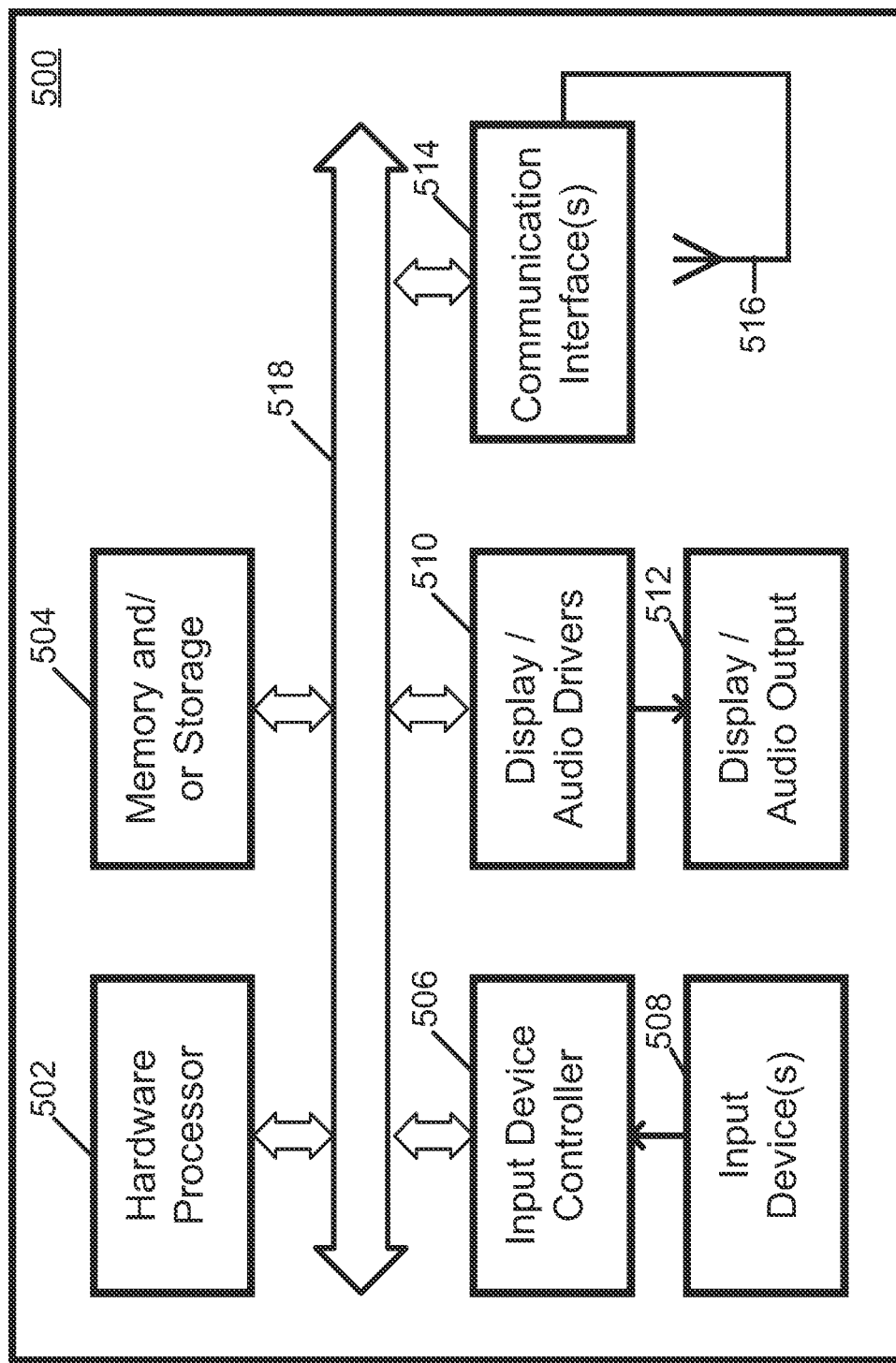
FIG. 5 shows a detailed example of hardware that can be used in a server and/or a user device of FIG. 4 in accordance with some embodiments of the disclosed subject matter.

Turning to FIG. 4, an illustrative example 400 of hardware for mobile device-assisted purchasing of content items for playback using a connected media device that can be used in accordance with some embodiments of the disclosed subject matter is shown. As illustrated, hardware 400 can include a server 402, a communication network 404, and/or one or more user devices 406, such as a mobile device 408 and a media device 410.

Server 402 can be any suitable server(s) for storing information, data, programs, media content, and/or any other suitable content. In some embodiments, server 402 can perform any suitable function(s). For example, in some embodiments, server 402 can be any suitable content server for storing content and transmitting the content to a user device for presentation. For example, in some embodiments, server 402 can be a server that transmits media content to user device 406 via communication network 404. It should be noted, however, that, in some embodiments, media content can be local media content that is stored on a suitable storage device (e.g., a memory) associated with user device 406, such as mobile device 408. In continuing this example, local media content can be transmitted from a storage device associated with mobile device 408 to media device 410. Additionally or alternatively, local media content may have been downloaded and stored in a suitable storage device from server 402 or any other suitable device (e.g., in peer-to-peer file sharing). In some embodiments, the content on server 402 can be any suitable content, such as a web page, video content, audio content, movies, television programs, live-streamed content, audiobooks, and/or any other suitable type of content.

In some embodiments, server 402 can be any suitable server(s) for identifying an existing session associated with a user account and the mobile device and transmitting authentication data corresponding to the identified session. For example, in some embodiments, server 402 can receive an authentication request from media device 410 and can identify the existing session in response to receiving the authentication request. As another example, in some embodiments, server 402 can generate authentication data and transmit the generated authentication data to media device 410. As yet another example, in some embodiments, server 402 can receive authentication requests that include user credentials (e.g., usernames, passwords, and/or any other suitable user credentials) corresponding to mobile device 408 (and/or any other suitable user device) and can establish sessions of a corresponding user account in response to receiving the user credentials.

In some embodiments, server 402 can be any suitable server(s) for establishing a communication channel between mobile device 408 and media device 410. For example, in some embodiments, mobile device 408 and media device 410 can each connect to device association server 402, and device association server 402 can transmit messages between mobile device 408 and media device 410.

Communication network 404 can be any suitable combination of one or more wired and/or wireless networks in some embodiments. For example, communication network 404 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 406 can be connected by one or more communications links (e.g., communications links 412) to communication network 404 that can be linked via one or more communications links (e.g., communications links 414) to server 402. The communications links can be any communications links suitable for communicating data among user devices 406 and server 402 such as network links, dial-up links, wireless links, hard-wired links, any other suitable communications links, or any suitable combination of such links.

In some embodiments, mobile device 408 can be any suitable user device for receiving encoded offer data corresponding to an offer being provided on a connected media device 410, presenting user interfaces for proceeding through a payment process for purchasing a content item for playback on media device 410, transmitting messages to media device 410, casting the purchased content item for playback on media device 410, and/or any other suitable functions. In some embodiments, media device 410 can be any suitable device for encoding offer data, presenting received content, and/or performing any other suitable functions. In some embodiments, user devices 406 can be any suitable type of user devices. For example, in some embodiments, user devices 406 can be implemented as a mobile device, such as a smartphone, mobile phone, a tablet computer, a wearable computer, a laptop computer, a vehicle (e.g., a car, a boat, an airplane, or any other suitable vehicle) entertainment system, a portable media player, and/or any other suitable mobile device. As another example, in some embodiments, user devices 406 can be implemented as a non-mobile device, such as a desktop computer, a set-top box, a television, a streaming media player, a game console, a speaker, home entertainment device, a media playback device, and/or any other suitable non-mobile device.

In a more particular example, user device 406 can be a display device that includes hardware and/or software for presenting media received from one or more sources of media content. For example, user device 406 can include a television, a smart television, a monitor, a set-top box, an audio video (AV) receiver, any other suitable media playback device and/or any suitable combination thereof. More particularly, user device 406 can include a display, speakers, hardware and/or software for rendering media content such as analog and/or digital video and/or audio data, a power supply, etc. User device 406 can, in some embodiments, include various input ports for receiving video and/or audio data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc.

In another more particular example, user device 406 can be any suitable device that can receive an audio signal and output the audio signal (potentially through one or more intermediate devices) to one or more speakers. For example, user device 406 can be an audio video (AV) receiver, a speaker, an amplifier, an audio switch, an HDMI switch, any other suitable audio system and/or any suitable combination thereof. More particularly, user device 206 can include, speakers, hardware and/or software for rendering media content such as analog and/or digital audio and/or video data, a power supply, etc. User device 406 can include various input ports for receiving audio and/or video data from various sources. Such input ports can include one or more HDMI ports, one or more component video ports, one or more composite video ports, one or more USB ports, one or more S-Video ports, one or more TOSLINK ports, one or more coaxial ports, one or more Ethernet ports (whether wired or wireless), etc. Additionally or alternatively, in some embodiments, user device 406 can be configured to receive an audio signal over any suitable wireless connection, such as over a connection to a local area network (e.g., via a connection that complies with one of the IEEE 802.11x family of protocols which are sometimes referred to as Wi-Fi connections), or a wireless connection between external sound system 406 and mobile device 408, such as an ad hoc wireless network connection, a short-range wireless communication protocol (e.g., Bluetooth, Bluetooth Low Energy, Wireless USB, etc.), etc.

Although server 402 is illustrated as one device, the functions performed by server 402 can be performed using any suitable number of devices in some embodiments. For example, in some embodiments, multiple devices can be used to implement the functions performed by server 402.

Although two user devices 408 and 410 are shown in FIG. 4 to avoid over-complicating the figure, any suitable number of user devices, and/or any suitable types of user devices, can be used in some embodiments.

Server 402 and user devices 406 can be implemented using any suitable hardware in some embodiments. For example, in some embodiments, devices 402 and 406 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 500 of FIG. 5, such hardware can include hardware processor 502, memory and/or storage 504, an input device controller 506, an input device 508, display/audio drivers 510, display and audio output circuitry 512, communication interface(s) 514, an antenna 516, and a bus 518.

Hardware processor 502 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 502 can be controlled by a server program stored in memory and/or storage of a server, such as server 402. In some embodiments, hardware processor 502 can be controlled by a computer program stored in memory and/or storage 504 of user device 406.

Memory and/or storage 504 can be any suitable memory and/or storage for storing programs, data, and/or any other suitable information in some embodiments. For example, memory and/or storage 504 can include random access memory, read-only memory, flash memory, hard disk storage, optical media, and/or any other suitable memory.

Input device controller 506 can be any suitable circuitry for controlling and receiving input from one or more input devices 508 in some embodiments. For example, input device controller 506 can be circuitry for receiving input from a touchscreen, from a keyboard, from one or more buttons, from a voice recognition circuit, from a microphone, from a camera, from an optical sensor, from an accelerometer, from a temperature sensor, from a near field sensor, from a pressure sensor, from an encoder, and/or any other type of input device.

Display/audio drivers 510 can be any suitable circuitry for controlling and driving output to one or more display/audio output devices 512 in some embodiments. For example, display/audio drivers 510 can be circuitry for driving a touchscreen, a flat-panel display, a cathode ray tube display, a projector, a speaker or speakers, and/or any other suitable display and/or presentation devices.

Communication interface(s) 514 can be any suitable circuitry for interfacing with one or more communication networks (e.g., computer network 404). For example, interface(s) 514 can include network interface card circuitry, wireless communication circuitry, and/or any other suitable type of communication network circuitry.

Antenna 516 can be any suitable one or more antennas for wirelessly communicating with a communication network (e.g., communication network 404) in some embodiments. In some embodiments, antenna 516 can be omitted.

Bus 518 can be any suitable mechanism for communicating between two or more components 502, 504, 506, 510, and 514 in some embodiments.

Any other suitable components can be included in hardware 500 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for presenting media content items using multiple devices are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting media content, the method comprising:
    detecting, using a media device, an offer to initiate a purchase of a content item being presented using the media device, wherein the media device has not been authenticated with a content service that is providing the content item;
    in response to detecting the offer to initiate the purchase of the content item when the media device has not been authenticated with the content service that is providing the content item, causing the media device to be discoverable by mobile devices that are proximal to the media device;
    encoding offer data corresponding to the detected offer to initiate the purchase of the content item; and
    in response to receiving a status request from a mobile device that is one of the mobile devices and that is proximal to the media device, transmitting the encoded offer data associated with the purchase of the content item to the mobile device, wherein the encoded offer data causes a payment user interface to be presented on the mobile device.

2. The method of claim 1, further comprising:
receiving a cast request from the mobile device to cast the content item on the media device; and
in response to the cast request, executing a receiver application on the media device that accepts the cast request from the mobile device and causes the content item to be presented using the media device.

3. The method of claim 1, wherein the media device is executing a media playback application and the mobile device is executing a corresponding media playback application, wherein the media playback application transmits the encoded offer data to the corresponding media playback application executing on the mobile device, and wherein, in response to transmitting the encoded offer data to the mobile device, the media device inhibits the transmission of the encoded offer data to remaining mobile devices that are connected to the same local area network.

4. The method of claim 1, wherein the encoded offer data causes the mobile device to retrieve corresponding human-readable information from a server and wherein the human-readable information is presented in the payment user interface on the mobile device.

5. The method of claim 1, further comprising receiving authentication information from the mobile device, wherein the authentication information corresponds to a user account that was used to complete the purchase via the payment user interface on the mobile device.

6. The method of claim 5, wherein the authentication information causes the media device to retrieve a corresponding authentication token from an authentication server, wherein the corresponding authentication token authenticates the user account on the media device.

7. The method of claim 1, wherein the cast request indicates that the mobile device is authorized to play back the content item.

8. A system for presenting media content, the system comprising:
a memory; and
a hardware processor that, when executing computer-executable instructions stored in the memory, is configured to:
  detect, using a media device, an offer to initiate a purchase of a content item being presented using the media device, wherein the media device has not been authenticated with a content service that is providing the content item;
  in response to detecting the offer to initiate the purchase of the content item when the media device has not been authenticated with the content service that is providing the content item, cause the media device to be discoverable by mobile devices that are proximal to the media device;
  encode offer data corresponding to the detected offer to initiate the purchase of the content item; and
  in response to receiving a status request from a mobile device that is one of the mobile devices and that is proximal to the media device, transmit the encoded offer data associated with the purchase of the content item to the mobile device, wherein the encoded offer data causes a payment user interface to be presented on the mobile device.

9. The system of claim 8, wherein the hardware processor is further configured to:
  receive a cast request from the mobile device to cast the content item on the media device; and
  in response to the cast request, execute a receiver application on the media device that accepts the cast request from the mobile device and causes the content item to be presented using the media device.

10. The system of claim 8, wherein the media device is executing a media playback application and the mobile device is executing a corresponding media playback application, wherein the media playback application transmits the encoded offer data to the corresponding media playback application executing on the mobile device, and wherein, in response to transmitting the encoded offer data to the mobile device, the media device inhibits the transmission of the encoded offer data to remaining mobile devices that are connected to the same local area network.

11. The system of claim 8, wherein the encoded offer data causes the mobile device to retrieve corresponding human-readable information from a server and wherein the human-readable information is presented in the payment user interface on the mobile device.

12. The system of claim 8, wherein the hardware processor is further configured to receive authentication information from the mobile device, wherein the authentication information corresponds to a user account that was used to complete the purchase via the payment user interface on the mobile device.

13. The system of claim 12, wherein the authentication information causes the media device to retrieve a corresponding authentication token from an authentication server, wherein the corresponding authentication token authenticates the user account on the media device.

14. The system of claim 8, wherein the cast request indicates that the mobile device is authorized to play back the content item.

15. A non-transitory computer-readable medium containing computer-executable instructions that, when executed by a processor, cause the processor to perform a method for presenting media content, the method comprising:
  detecting, using a media device, an offer to initiate a purchase of a content item being presented using the media device, wherein the media device has not been authenticated with a content service that is providing the content item;
  in response to detecting the offer to initiate the purchase of the content item when the media device has not been authenticated with the content service that is providing the content item, causing the media device to be discoverable by mobile devices that are proximal to the media device;
  encoding offer data corresponding to the detected offer to initiate the purchase of the content item; and
  in response to receiving a status request from a mobile device that is one of the mobile devices and that is proximal to the media device, transmitting the encoded offer data associated with the purchase of the content item to the mobile device, wherein the encoded offer data causes a payment user interface to be presented on the mobile device.

16. The non-transitory computer-readable medium of claim 15, wherein the method further comprises:
  receiving a cast request from the mobile device to cast the content item on the media device; and
  in response to the cast request, executing a receiver application on the media device that accepts the cast request from the mobile device and causes the content item to be presented using the media device.

17. The non-transitory computer-readable medium of claim 15, wherein the media device is executing a media playback application and the mobile device is executing a corresponding media playback application, wherein the media playback application transmits the encoded offer data to the corresponding media playback application executing on the mobile device, and wherein, in response to transmitting the encoded offer data to the mobile device, the media device inhibits the transmission of the encoded offer data to remaining mobile devices that are connected to the same local area network.

18. The non-transitory computer-readable medium of claim 15, wherein the encoded offer data causes the mobile device to retrieve corresponding human-readable information from a server and wherein the human-readable information is presented in the payment user interface on the mobile device.

19. The non-transitory computer-readable medium of claim 15, wherein the method further comprises receiving authentication information from the mobile device, wherein the authentication information corresponds to a user account that was used to complete the purchase via the payment user interface on the mobile device.

20. The non-transitory computer-readable medium of claim 19, wherein the authentication information causes the media device to retrieve a corresponding authentication token from an authentication server, wherein the corresponding authentication token authenticates the user account on the media device.

21. The non-transitory computer-readable medium of claim 15, wherein the cast request indicates that the mobile device is authorized to play back the content item.

\* \* \* \* \*